United States Patent [19]

Matsuo

[11] Patent Number: 4,598,195
[45] Date of Patent: Jul. 1, 1986

[54] SAFETY TEMPERATURE CIRCUIT INCLUDING ZERO CROSSING DETECTOR

[75] Inventor: Katsuharu Matsuo, Aichi, Japan

[73] Assignee: Tokyo Shibaura Denki Kabushiki Kaisha, Kawasaki, Japan

[21] Appl. No.: 728,460

[22] Filed: May 1, 1985

Related U.S. Application Data

[63] Continuation of Ser. No. 508,237, Jun. 27, 1983, abandoned.

[30] Foreign Application Priority Data

Jul. 2, 1982 [JP] Japan ............................... 57-115896
Jul. 14, 1982 [JP] Japan ............................... 57-123414
Jul. 14, 1982 [JP] Japan ............................... 57-123415
Sep. 22, 1982 [JP] Japan ........................... 57-145370[U]

[51] Int. Cl.$^4$ ............................................. H03B 1/02
[52] U.S. Cl. .................................... 219/497; 219/501; 219/499; 219/508; 323/235
[58] Field of Search ............... 219/494, 497, 499, 501, 219/505, 508, 509, 510; 323/369, 235, 319, 236

[56] References Cited

U.S. PATENT DOCUMENTS

| 3,548,155 | 12/1970 | Rabindran | 219/497 |
| 3,646,577 | 2/1972 | Ernst | 219/499 |
| 3,821,516 | 6/1974 | Hayes et al. | 219/494 |
| 4,029,937 | 6/1977 | Russell | 219/501 |
| 4,086,466 | 4/1978 | Scharlack | 219/494 |
| 4,278,873 | 7/1981 | Petrides | 219/501 |
| 4,296,312 | 10/1981 | Salem | 219/501 |

Primary Examiner—M. H. Paschall
Attorney, Agent, or Firm—Cushman, Darby & Cushman

[57] ABSTRACT

A temperature control apparatus has a first comparator circuit for comparing the voltage corresponding to thermal data provided by a thermal sensor with a first reference voltage generated in synchronism with the zero crossings of an AC power source. The first comparator circuit generates a pulsative output voltage which is synchronous with the zero crossings of the AC power source. This output voltage causes a second reference voltage to be applied to a second comparator circuit in the form of a pulsative voltage. The second comparator circuit compares the thermal data voltage with the second reference voltage and generates a pulse signal. This pulse signal drives a trigger circuit which triggers a thyristor connected to an electric heater.

10 Claims, 31 Drawing Figures

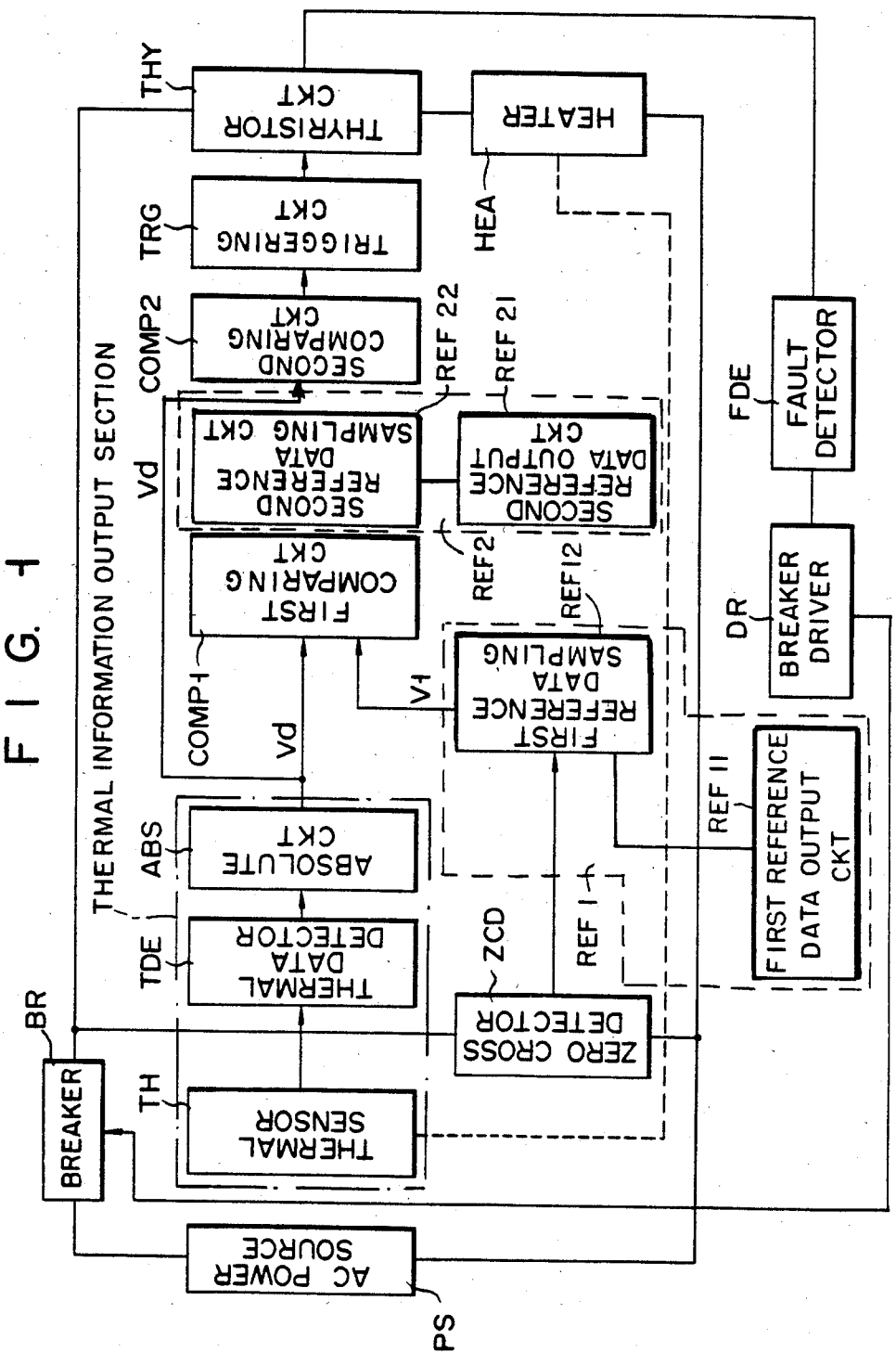

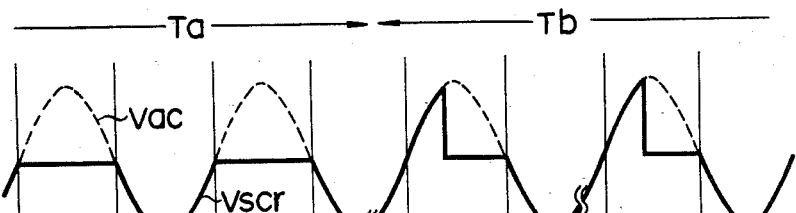
FIG.4(a)
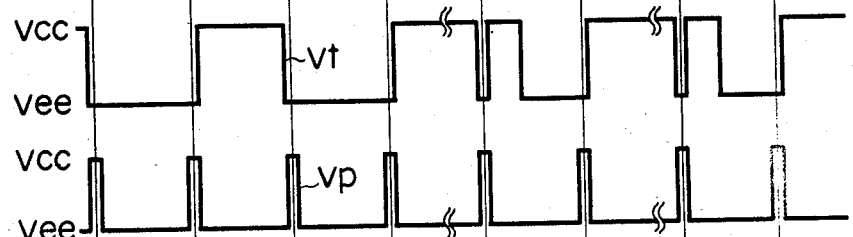
FIG.4(b)
FIG.4(c)
FIG.4(d)
FIG.4(e)
FIG.4(f)
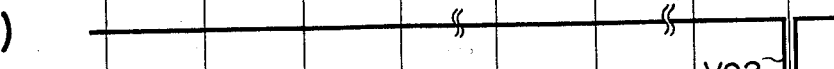
FIG.4(g)

F I G. 5
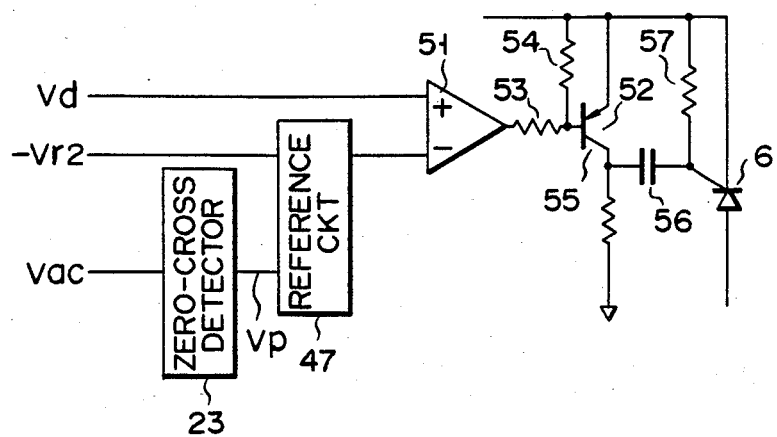
F I G. 6
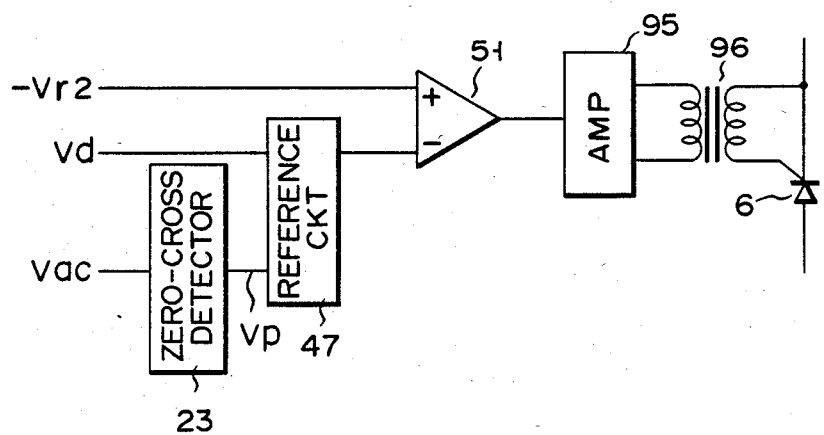
F I G. 7
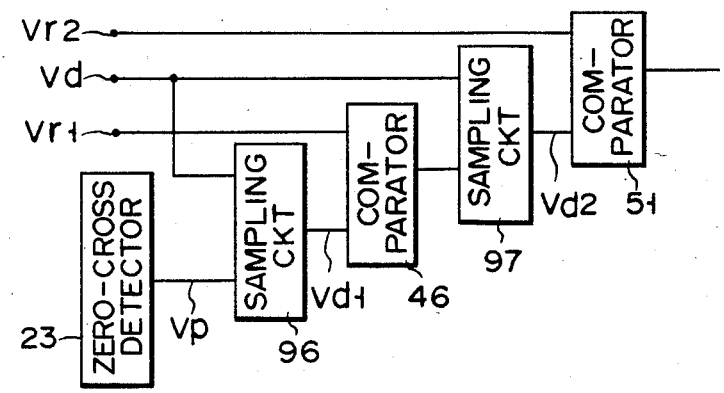

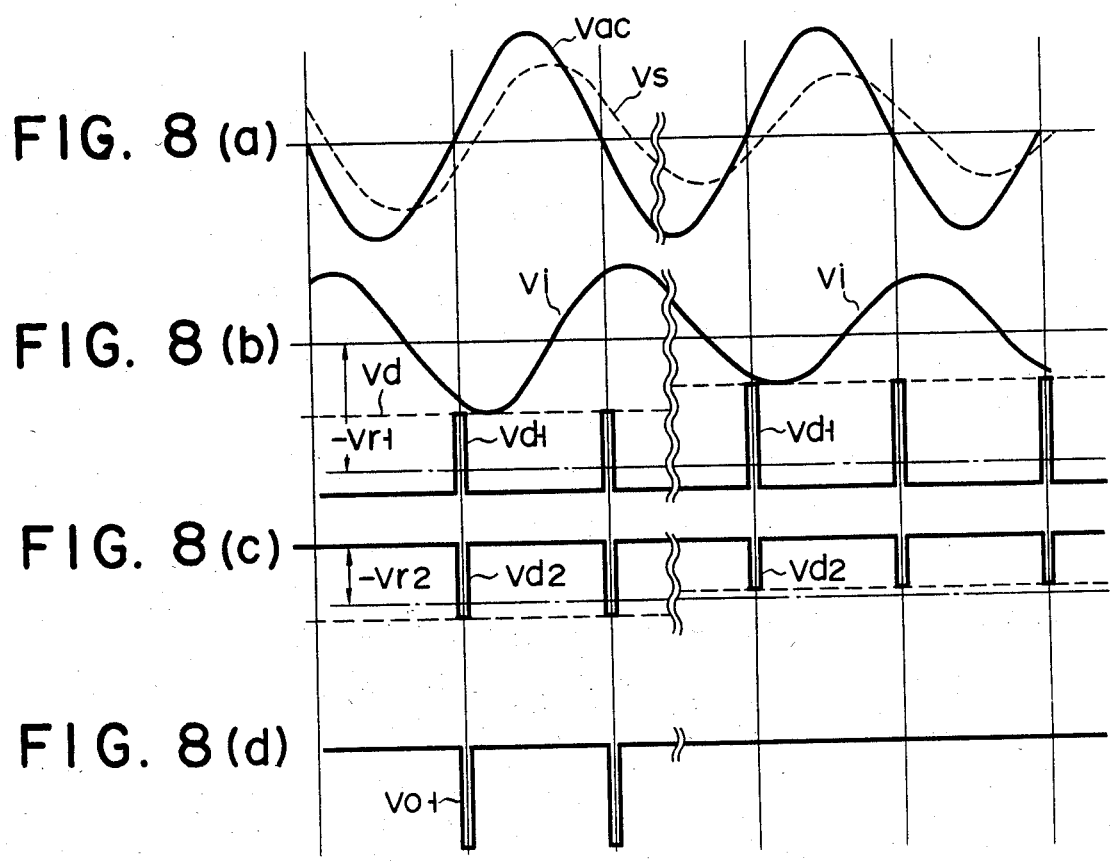
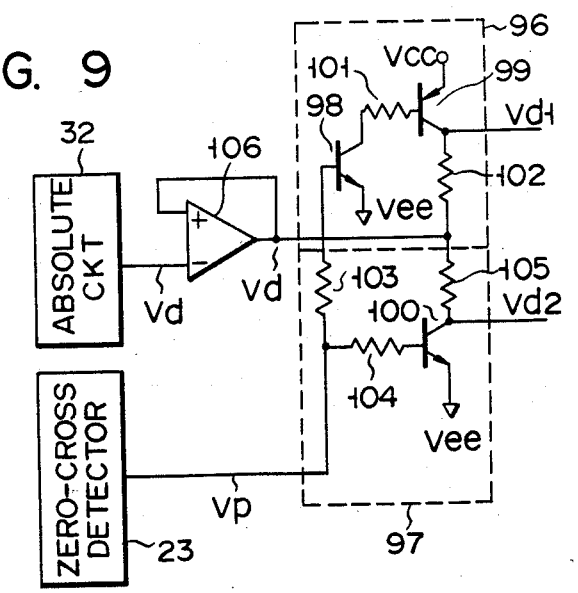

F I G. 13
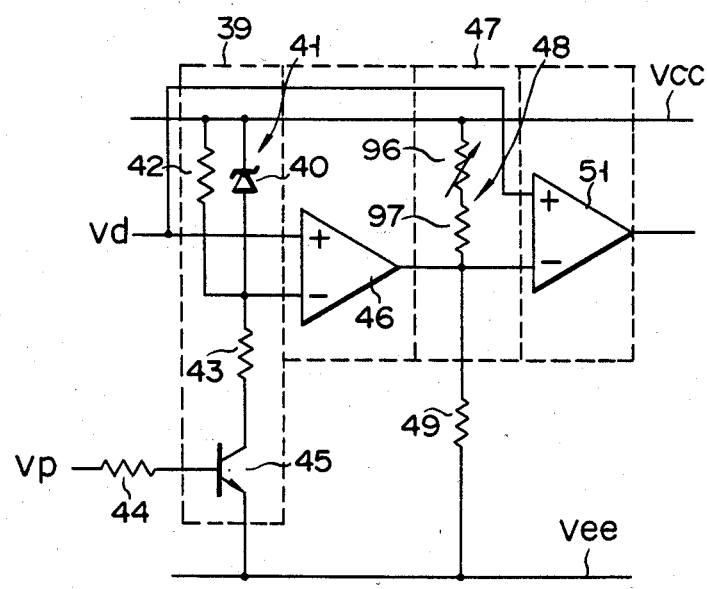
F I G. 14
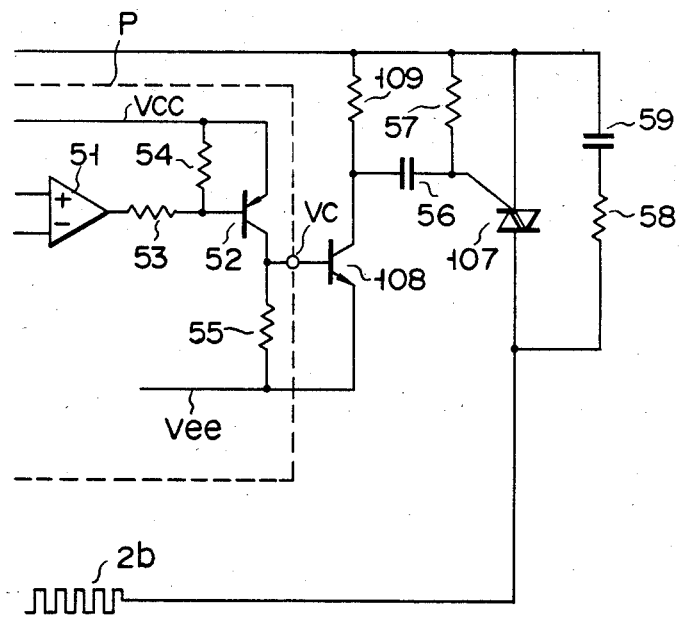

SAFETY TEMPERATURE CIRCUIT INCLUDING ZERO CROSSING DETECTOR

This is a continuation of application Ser. No. 508,237, filed June 27, 1983, now abandoned.

BACKGROUND OF THE INVENTION

This invention relates to a temperature control apparatus and, more particularly, to a temperature control apparatus for controlling the temperature of flat heating equipment such as an electric blanket or an electric carpet.

Electric blankets and electric carpets are safely and extensively used. Such flat heating equipment comprises a combination of a cord like heater and a cord-like thermal sensor. The heater is on-off controlled according to thermal data obtained from a thermal sensor. The heater is turned on and off in synchronism with zero crossings of the AC output of an AC power source. Usually, a thyristor which is connected in series with the heater is used for this. To be more specific, in temperature control the temperature detected by the thermal sensor is compared with a preset temperature and, when the detected temperature is lower than the preset temperature, the heater is supplied with power by turning on the thyristor in synchronism with a zero crossing of the AC power source output. When the detected temperature exceeds the preset temperature, the thyristor is turned off in synchronism with a zero crossing. Consequently, the heater is no longer energized. In this way, the electric blanket or carpet is kept at a preset temperature when it is in use.

The temperature control system of this type includes a safety circuit, which functions to prevent an abnormal temperature increase in the electric blanket or carpet when a fault occurs in the temperature control section. In most cases, the safety circuit can prevent an abnormal increase in temperature. However, if there is a fault in the safety circuit itself, it is not possible to prevent a temperature increase by discontinuing power supply to the heater.

SUMMARY OF THE INVENTION

An object of the invention is to provide a temperature control apparatus, which can reliably prevent an abnormal temperature rise.

According to the invention there is provided a temperature control apparatus, which comprises a thermal sensor and a comparator for comparing a temperature detection signal from the thermal sensor and a reference temperature signal, the comparator producing a switching control signal in the form of a pulse signal in synchronism with zero crossings of an AC power source output, the pulse control signal being fed to a switching circuit, a switching element being triggered to supply power to a heater only when the control pulse signal is provided.

BRIEF DESCRIPTION OF THE DRAWINGS

FIG. 1 is a block diagram showing an embodiment of the temperature control apparatus according to the invention;

FIGS. 4(a)–4(g) are time charts for explaining operation of a safety circuit shown in FIGS. 2A and 2B;

FIG. 5 is a schematic representation of a modification of a thyristor trigger circuit shown in FIG. 1;

FIG. 6 is a schematic representation of a modification of a thyristor trigger circuit;

FIG. 7 is a block diagram showing a modification of a pulse control signal generator;

FIGS. 8(a)–8(d) are time charts for explaining the operation of the circuit of FIG. 7;

FIG. 9 is a schematic representation of sampling circuits shown in FIG. 7;

FIG. 13 is a circuit diagram showing a further modification of the reference circuit; and FIG. 14 is a circuit diagram showing a modification of a switching circuit.

DETAILED DESCRIPTION OF THE PREFERRED EMBODIMENTS

Figure 2A:
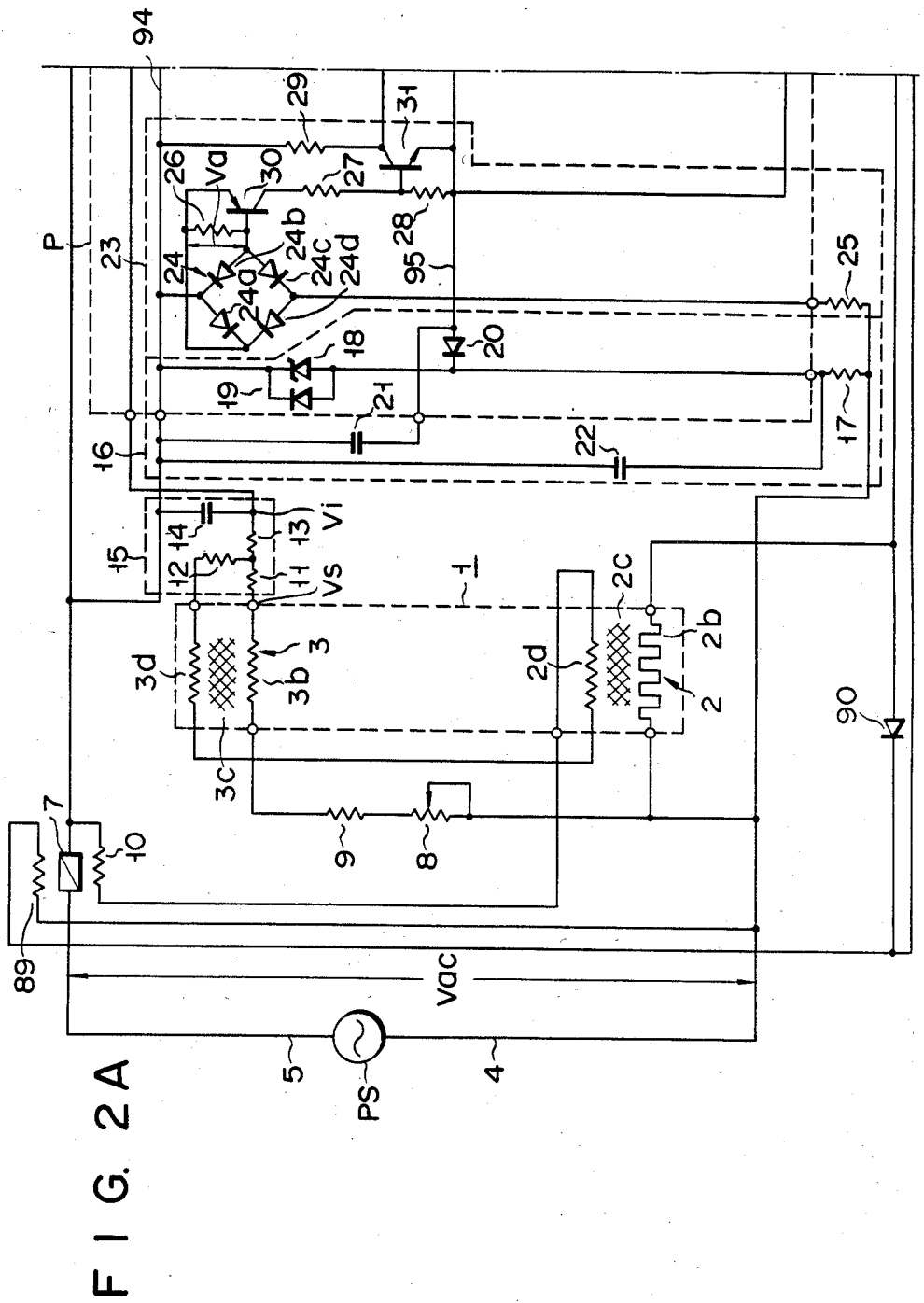
FIGS. 2A and 2B form a wiring diagram of the temperature control apparatus shown in FIG. 1.

Referring now to the block diagram of FIG. 1, an AC power source PS is connected through a circuit breaker BR to a series circuit of a thyristor circuit THY and a heater HEA. The heater HEA comprises a cord-like heater used for an electric blanket or the like. A thermal sensor TH which has a negative temperature coefficient is provided in the vicinity of the heater HEA and provides thermal data representing the temperature thereof. It is connected to a thermal data detector TDE, which is in turn connected to an absolute value circuit ABS for converting the input terminal data into a corresponding absolute value. The absolute value circuit ABS is connected to a first comparator COMP1. A first reference circuit REF1 is connected to the first comparator COMP1. The circuit REF 1 includes a first reference data output circuit REF 11 and a first reference data sampling circuit REF 12 which feeds a reference signal to the first comparator COMP1 in response to a zero-crossing signal provided from a zero-crossing detector ZCD. The zero-crossing signal is provided from the zero-crossing detector ZCD in synchronism with the zero crossing of the AC power source output. The absolute value circuit ABS feeds the output to a second comparator COMP2. The first comparator COMP1 and a second reference circuit REF2 which includes a second reference data output circuit REF 11 and a second reference data sampling circuit REF 12 are connected to the input side of the second comparator COMP2. The second comparator COMP2 feeds the output to a thyristor trigger circuit TRG. The thyristor trigger circuit TRG feeds the output to a control input terminal of the thyristor circuit THY. A fault detector FDE is connected to the thyristor circuit THY for detecting a fault therein. The fault detector FDE feeds the output to a circuit breaker BR.

In the circuit of FIG. 1, when the AC power source PS is turned on, the thermal sensor TH provides thermal data that represents the temperature of the heater HEA. The thermal data detector TDE detects the thermal data and couples it to the absolute value circuit ABS. The absolute value circuit ABS converts the input thermal data into absolute value data, and where the thermal data is an alternating-current thermal signal, the absolute ABS converts this signal into an absolute direct-current thermal signal. This absolute thermal signal is fed together with a reference signal from the reference circuit REF1 to the first comparator COMP1. The reference signal provided from the first reference circuit REF1 is a pulse signal synchronizing with zero-crossings of the AC power source output, so that the first comparator COMP1 also provides a pulse signal. The second reference signal circuit REF provides a second reference signal, which is sampled under the control of the pulse signal output of the first comparator COMP1, the sampled second reference signal being fed to the second comparator COMP2. The second comparator COMP2 compares the output signal Vd of the absolute value circuit ABS and the sampled signal V2. At this time, the signal Vd is at a lower level than the signal V2, so that the second comparator COMP2 provides a pulse signal V01 synchronizing with the signal V2. The thyristor trigger circuit TRG triggers the thyristor circuit THY in synchronism with the pulse signal V01. Current is thus caused to pass through the heater HEA to generate heat during a positive half cycle period of the AC power source output. During the subsequent negative half cycle period a thyristor in the thyristor circuit THY is reverse biased and kept off so that no power is supplied to the heater HEA. The heater HEA is again supplied with power during the next positive half cycle in the manner as described. As the heater HEA is thus energized intermittently, the temperature that is detected by the thermal sensor TH gradually increases. When the thermal data value of the thermal sensor TH exceeds a preset temperature value, the signal Vd becomes higher in level than the reference signal V2. Consequently, the second comparator COMP2 produces a signal at a fixed level to render the thyristor trigger circuit TRG inoperative. When this occurs, the thyristor circuit THY is no longer turned on, that is, power is no longer supplied to the heater HEA until the temperature of the heater HEA decreases below the preset temperature.

When a fault occurs in the thyristor circuit THY, the fault detector FDE detects the fault to cause the circuit breaker driver DR to drive the circuit breaker BR. The circuit breaker BR thus opens the load circuit.

Figure 2B:
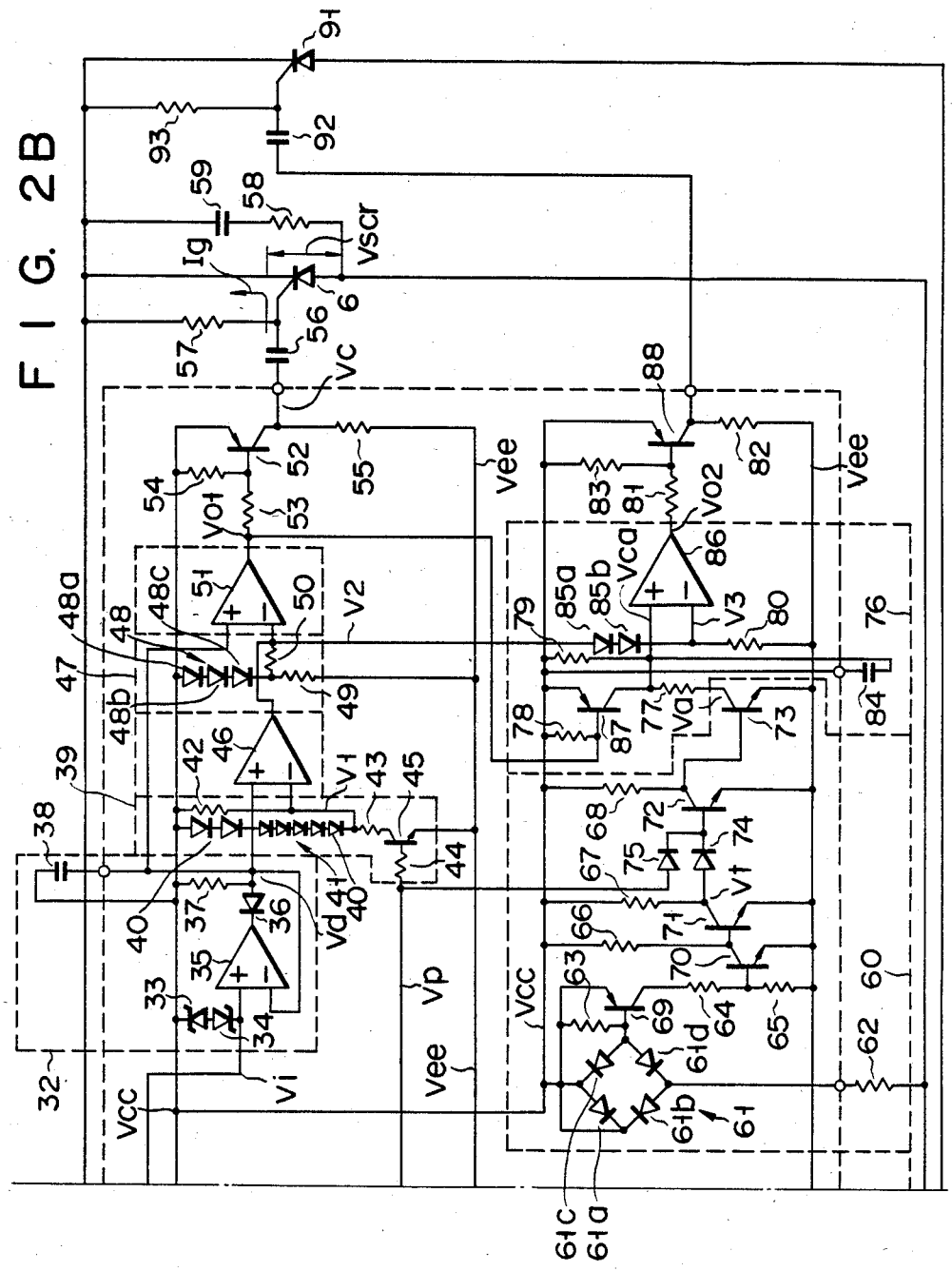
Figure 3A:
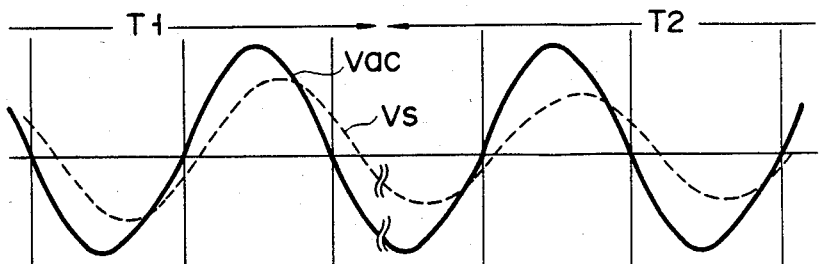
FIGS. 3(a)–3(h) are time charts for explaining the operation of the circuit of FIGS. 2A and 2B.
Figure 3B:
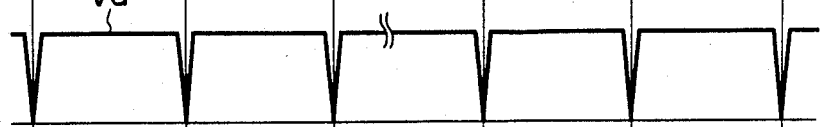
Figure 3C:
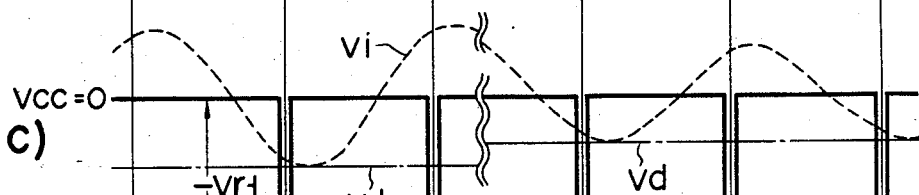
Figure 3D:
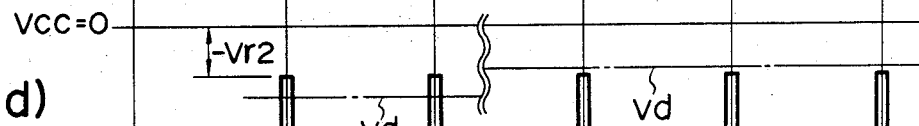
Figure 3E:
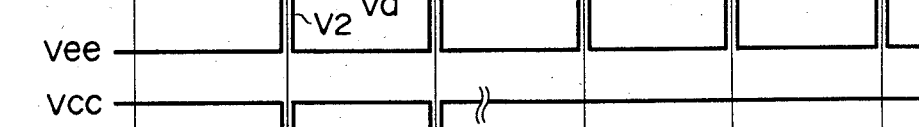
Figure 3F:
Figure 3G:
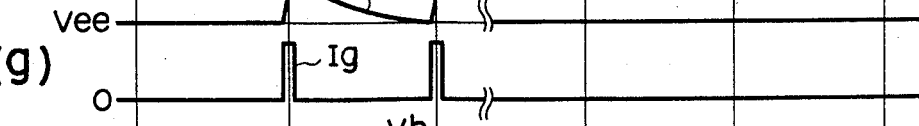
Figure 3H:
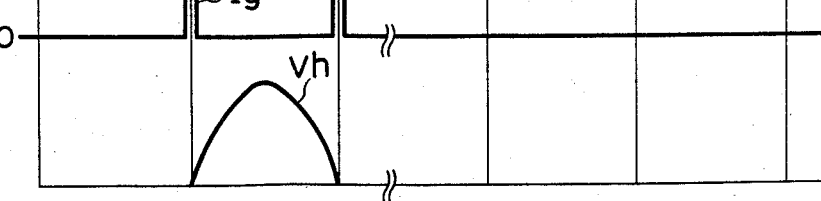

FIGS. 2A and 2B form a wiring circuit diagram of the temperature control apparatus shown in FIG. 1. Referring to these Figures, a flat heating equipment, e.g., electric blanket 1 has heater 2 and thermal sensor 3. Lines 4 and 5 lead from AC power source PS. The line 4 is connected to one terminal of a heating element 2b in the heater 2, and also is connected through a temperature setting potentiometer 8 and a resistor 9 to one terminal of a sensing conductor line 3b of the thermal sensor 3. The other line 5 is connected through a thermal fuse 7 to the cathode of a thyristor 6 which serves as a switching element. The anode of the thyristor 6 is connected through a diode 90 and a heating element 89 to the line 4. The connection point between the thyristor 6 and diode 90 is connected to the other terminal of the heating element 2b. The connection point between the thermal fuse 7 and thyristor 6 is connected through a heating element 10 and an over-heating sensing line 2d of the heater 2 to a sensing line 3b of the thermal sensor 3. The thermal sensor 3 has output terminals connected to thermal data detector 15. The thermal data detector 15 includes resistors 11, 12 and 13 and a capacitor 14.

A rectifier 16 is connected across the AC power source PS. It includes a resistor 17 with one terminal connected to the line 4 and the other terminal connected in series with a circuit composed of a zener diode 18 and a diode 19 in parallel with each other to the thermal fuse 7. The anode of the diode 19 is connected to the cathode of a diode 20, the anode of which is connected through a capacitor 21 to a line 94 leading from the connection point between the thermal fuse 7 and thyristor 6. The line 94 is connected through the capacitor 22 and resistor 17 to the line 4. It also is connected through a bridge circuit 24 in zero-crossing detector 23 and a resistor 25 to the line 4. The bridge circuit 24 is composed of diodes 24a to 24d constituting the respective four sides of a bridge. Each of the diodes 24a and 24d has the cathode connected to the emitter of a transistor 30, and each of the diodes 24b and 24c has the anode connected to the base of the transistor 30. A resistor 26 is connected between the base and emitter of the transistor 30. The collector of the transistor 30 is connected through resistors 27 and 28 to a line 95. The line 95 is connected to the anode of the diode 20. The connection point between the resistors 27 and 28 is connected to the base of a transistor 31. The transistor 31 has the collector connected through a resistor 29 to the line 94 and the emitter connected to the line 95.

The line 94 is connected to the cathode of a zener diode 33 in absolute value circuit 32. The zener diode 33 is back-to-back connected to another zener diode 34 in the absolute value circuit 32. The output terminal of the thermal data detector 15 is connected to the cathode of the zener diode 34 and also to the non-inverting input terminal of an operational amplifier 35 which is also in the absolute value circuit 32. The output terminal of the operational amplifier 35 is connected to the cathode of a diode 36. The anode of the diode 36 is connected through a resistor 37 to the line 94 and also connected to the inverting input terminal of the operational amplifier 35. It is further connected to first comparator, i.e., the non-inverting input terminal of an operational amplifier 46. A capacitor 38 is connected in parallel with the resistor 37.

The inverting input terminal of the operational amplifier 46 is connected to the output terminal of the first reference circuit 39, i.e., the last one of seven series diodes 40 constituting a reference voltage generator 41. The cathode of the last one of the diodes 40 is connected through a resistor 43 to the collector of a transistor 45 and also connected through a resistor 42 to the line 94. The transistor 45 has the emitter connected to the line 95 and the base connected through a resistor 44 to the collector of the transistor 31 in the zero-crossing detector 23.

The output terminal of the operational amplifier 46 is connected through the output terminal of second reference circuit 48 to the inverting input terminal of an operational amplifier 51 which constitutes a second comparator. Second reference circuit 48 includes diodes 48a to 48c connected in series between the line 94 and a resistor 49. The cathode of the diode 48c is connected through a resistor 50 to the inverting input terminal of the operational amplifier 51. The output terminal of the operational amplifier 51 is connected through a resistor 53 to the base of a transistor 52 in thyristor trigger circuit. The transistor 52 has the emitter connected to the line 94 and the collector connected through a resistor 55 to the line 95. A resistor 54 is connected between the base and emitter of the transistor 52. Its collector is connected through a capacitor 56 to the gate of the thyristor 6. The gate of the thyristor 6 is connected through a resistor 57 to the line leading from the thermal fuse 57.

Fault detector 60 includes a bridge rectifier circuit 61 with the four sides thereof constituted by respective diodes 61a to 61d. The connection point between the diodes 61a and 61c is connected to the line 94, while the connection point between the diodes 61a and 61d is connected through a resistor 62 to the anode of the thyristor 6. Each of the diodes 61a and 61b has the cathode connected to the emitter of the transistor 69, and each of the diodes 61c and 61d has the anode connected to the base of the transistor 69. A resistor 63 is connected between the base and emitter of the transistor 69. The collector of the transistor 69 is connected through resistors 64 and 65 to the line 95. The connection point between the resistors 64 and 65 is connected to a base of a transistor 70. The collector of the transistor 70 is connected through a resistor 66 to the line 94 and also connected to the base of a transistor 71. The collector of the transistor 71 is connected through a resistor 67 to the line 94 and also connected through a diode 74 to the base of the transistor 72. The transistor 72 has the collector connected through a resistor 68 to the line 94 and the emitter connected to the line 95. The collector of the transistor 72 is also connected to the base of a transistor 73. The transistor 73 has a collector connected through a resistor 77 to the non-inverting input terminal of an operational amplifier 68 and the collector of a transistor 87 and the emitter connected to the line 95. The transistor 87 has the emitter connected to the line 94 and the base connected through a resistor 78 to the line 94 and also connected to the output terminal of the operational amplifier 51. A resistor 79 and a capacitor 84 are connected in parallel between the line 94 and the non-inverting input terminal of the operational amplifier 86. The inverting input terminal of the operational amplifier 86 is connected through a resistor 80 to the line 95 and also connected through diodes 85a and 85b in a reverse direction to the inverting input terminal of the operational amplifier 51. The output terminal of the operational amplifier 86 is connected through a resistor 81 to the base of a transistor 88. The transistor 88 has the emitter connected to the line 94 and the collector connected through a resistor 82 to the line 94 and also connected through a capacitor 92 to the gate of a thyristor 91. The gate of the thyristor 91 is connected through a resistor 93 to the line leading from the thermal fuse 7. The thyristor 91 has the cathode connected to the line leading from the fuse 7 and the anode connected to the heating element 89.

The operation of the circuit of FIGS. 2A and 2B will now be described with reference to FIGS. 3 and 4.

When the AC power source PS is turned on, current is caused to flow through the potentiometer 8, resistor 9, impedance of the thermal sensing element 3c and heating element 10. As a result, an AC voltage Vs is produced between the conductors 3b and 3d as shown in (a) in FIG. 3. The voltage Vs is divided by the resistors 11 to 13 and capacitor 14 in the thermal data detector 15 to obtain a detection voltage Vi, which is fed from the output terminal of the thermal data detector 15 to the absolute value circuit 32. The voltage Vs corresponds to the temperature of the electric blanket 1, and hence the voltage Vi also corresponds to the temperature of the blanket 1. The voltage Vi is amplified through the operational amplifier 35, rectified by the diode 36 and smoothed by the capacitor 38. The absolute value circuit 32 thus produces a DC voltage Vd as shown in (c) in FIG. 5. The voltage Vd corresponds to the temperature of the electric blanket 1.

The rectifier 16 produces an AC voltage with the peak thereof set to a fixed value by the zener diode 18. The AC voltage is rectified through the diode 20 and smoothed through the capacitor 21. The rectifier 16 thus applies a DC voltage between the lines 94 and 95 to set the lines 94 and 95 at potentials Vcc and Vee, respectively. In the zero-crossing detector 23, the AC voltage input is full-wave rectified by the bridge circuit 24. The bridge circuit 24 produces a DC voltage Va as shown in (b) in FIG. 3. The DC voltage is applied between the base and emitter of the transistor 30. The transistor 30 is thus turned off in the neighborhood of zero crossings of the AC power supply voltage. When the transistor 30 is on, the transistor 31 is also on. At this time, the collector of the transistor 31 is at a Vee level, i.e., low level. When the transistor 30 is cut off in synchronism with each zero crossing of the AC power supply voltage, the transistor 31 is also cut off. At this time, the collector of the transistor 31 is brought to a Vcc level, i.e., high level. The voltage on the collector of the transistor 31 is shown in (c) in FIG. 4. When the transistor 45 is turned on, the first reference circuit 39 produces a reference voltage. To be more specific, when the transistor 45 is turned on, a voltage $-Vr1$ which is lower than the voltage Vcc by the forward voltage drop across the seven series diodes 40 (approximately $0.7\ V \times 7 = 4.9\ V$) appears at the connection point between the diodes 40 and resistor 43. This voltage $-Vr1$ is fed as a first reference voltage to the operational amplifier 46. The first reference voltage Vr1 is thus sampled under the control of the zero-crossing detection signal Vp provided from the zero-crossing detector 23. The sampled voltage V1 is fed to the inverting input terminal of the operational amplifier 46. The operational amplifier 46 compares the voltages Vd and V1. In the presence of the zero-crossing detection signal pulse, the voltage Vd is higher than the voltage V1 so that the operational amplifier 46 is off. In the absence of the zero-crossing detection signal pulse, during which time the transistor 45 is off, the voltage V1 is higher than the voltage Vd so that the operational amplifier 46 is on. When the operational amplifier 46 is turned off, a voltage $-Vr2$ which is lower than the voltage Vcc by a forward voltage drop across the three series diodes 48a to 48c (approximately $0.7\ V \times 3 = 2.1\ V$) appears at the connection point between the diode 48c and resistor 49. This voltage $-Vr2$ is fed as the second reference voltage. When the operational amplifier 46 is off, the voltage V2 is equal to the voltage Vee. The operational amplifier 51 compares the voltages Vd and V2. When $Vd < V2$ the output voltage V01 of the operational amplifier 51 is at a high level (Vcc), while when $Vd > V2$ it is at a low level (Vee) as shown in (e) in FIG. 3. When the output voltage V01 goes to the low level, the transistor 52 is turned on so that its collector voltage Vc rises as shown in (f) in FIG. 3. At this time, the capacitor 56 having been charged is discharged through the gate of the thyristor 6, i.e., a gate current Ig is caused to flow through the gate of the thyristor 6, thus turning on the thyristor 6. The thyristor 6 thus turned on is kept on for the positive half cycle of the AC power source output. During this period a positive half cycle voltage Vh is applied to the heating element 2b of the heater 2 to cause heat generation therefrom. During the subsequent negative half cycle, the thyristor 6 is kept off, causing no heat generation in the heater 2. When the next positive half cycle sets in, current is again passed through the heating element 2b of the heater 2. The temperature of the electric blanket 1 increases with the heat generation of the heater 2 caused for every positive half cycle of the AC power source output. The impedance of the thermal sensing element 3c in the thermal sensor 3 is reduced with the increasing temperature of the heater 2. Thus, the level of the output voltage Vi of the thermal data detector 15 is reduced, and the absolute value of the voltage Vd is reduced following the voltage Vi for a period T2 shown in FIG. 3. In the period T2, the operational amplifier 46 is turned off when the voltages Vd and V1 are compared under the control of the zero-crossing detection signal. The second reference voltage −Vr2 is thus applied to the inverting input terminal of the operational amplifier 51. The operational amplifier 51 compares the second reference voltage −Vr2 and voltage Vd. In the period T2, in which the voltage Vd is higher than the second reference voltage −Vr2, the operational amplifier 51 continues to provide the output voltage V01 of the high level (Vcc). The transistor 52 is thus kept off even during the presence of zero-crossing detection signal pulses, so that the thyristor 6 is not turned on. That is, the heater 2 is no longer furnished with power. It is to be appreciated that the temperature detected by the thermal sensor 3 exceeds a predetermined temperature, power is no longer supplied to the heater 2 to prevent a temperature increase of the electric blanket 1 beyond a preset temperature.

If it is arranged that the electric blanket 1 in the above embodiment reaches a preset temperature when the voltage Vs is approximately 50 V, when the temperature of the electric blanket 1 becomes lower than the preset temperature, the temperature control apparatus functions to make the voltage Vs approximately 50 V. While the temperature control apparatus is normally operating so that the thyristor 6 is normally on-off controlled, an AC voltage Vac as shown in (a) in FIG. 4 is fed to the bridge rectifying circuit 61 of the fault detector 60. The bridge rectifying circuit 61 full-wave rectifies the AC voltage Vac to produce a DC voltage corresponding to the voltage Va shown in FIG. 3. The transistor 69 is biased by the full-wave rectified voltage and on-off controlled in synchronism with the AC power source cycle. When the transistor 69 is turned on, the transistor 70 is turned on to turn off the transistor 71. When the transistor 69 is "off", the transistor 71 is "on". A voltage Vt as shown in (b) in FIG. 4 thus appears at the collector of the transistor 71. The voltage Vt is fed through the diode 74 to the base of the transistor 72, whereby the transistor 72 is on-off controlled according to the level of the voltage Vt. According to the on-off control of the transistor 72 the transistor 73 is on-off controlled, so that a voltage Va as shown in (d) in FIG. 4 appears at the collector of the transistor 73. The capacitor 84 is charged when the voltage Va is at a low level. When the voltage V01 goes to the low level, the transistor 87 is turned on to cause discharge of the capacitor 84. A voltage Vca as shown in (f) in FIG. 4 is thus applied to the non-inverting input terminal of the operational amplifier 86. A voltage V3 that rises in synchronism with the sampled signal V2 is fed to the inverting input terminal of the operational amplifier 86, and the operational amplifier 86 thus compares the voltages Vca and V3. In a period Ta, the voltage Vca is higher in level than the voltage V3, so that the operational amplifier 86 provides a high level voltage output V02 as shown in (g) in FIG. 4 thus turning off the transistor 88. As a result, the thyristor 91 is kept off. In this state, the thyristor 6 operated normally.

When a fault occurs in the thyristor 6, for instance the forward blocking voltage of the thyristor 6 is reduced, the thyristor 6 is turned on due to anode-to-cathode voltage in spite of the fact that no trigger signal is fed to the gate of the thyristor 6. At this time, the input to the bridge rectifying circuit 61 of the fault detector 60 is short-circuited, so that the bridge circuit 61 does not provide any output. Thus, with the thyristor 6 turned on the transistor 69 is turned on to turn on the transistor 71, thus changing the voltage Vt to the low level (Vee) to change the voltage Va to the low level. At this time, the capacitor 84 is charged to reduce the voltage Vca. When the voltage Vca becomes lower than the peak of the voltage V3, the voltage V02 at the output terminal of the operational amplifier 86 goes to a low level with the appearance of AC power source voltage zero-crossing detection signal as shown in (g) in FIG. 4. As a result, the transistor 88 is turned on to turn on the thyristor 91, causing current to flow through the thyristor 91 to the heating element 89. The fuse 7 is thus melted by the temperature of the heating element 89 to discontinue the power supply to the heating element 2b of the heater 2.

As has been shown, with the construction described above when transistor 52 is in an open-circuit state due to a fault therein, the collector of transistor 52 is held at the low level to keep the capacitor 56 charged. In this state, the thyristor 6 is no longer turned on, and hence the heating element 2b is no longer energized, even when the temperature of the blanket 1 is low. When transistor 52 is short circuited due to a fault, a discharging circuit consisting of the capacitor 56, resistor 57 and transistor 52 is formed. Repeated charging and discharging of the capacitor 56 thus no longer takes place, so that the thyristor 6 is kept off. It is to be understood that when an open-circuit or short-circuit state is brought about due to a fault in the transistor 52, the thyristor 6 is no longer turned on, so that the heater 2 is no longer furnished with power. Further, when the operational amplifier 51 or 46 or transistors 45, 31 and 30 in the zero-crossing detector preceding the transistor 52 are open or short-circuited, the pulse signal is no longer fed to the transistor 52. Thus, the thyristor 6 is no longer turned on when there is a fault in the transistor 52. Generally, when a fault occurs in the reference circuit 39, operational amplifier 46, reference circuit 47 or operational amplifier 51, these elements being in series with one another, the thyristor 6 is kept off to inhibit power supply to the heater 2. The electric blanket 1 thus will never be over-heated due to a fault that may occur in a circuit element in the temperature control apparatus. For example, when a fault occurs in the first comparator 46, which monitors the normal operation of the safety circuit or device such as the thermal fuse, the power supply to the heater 2 is discontinued without agency of the safety circuit. Further, the safety of the electric blanket can be ensured even when faults occur simultaneously in a plurality of different circuit elements 2. The temperature control apparatus thus is fail-safe.

In the above construction, the first reference voltage −Vr1 of the first reference voltage generator 41 and the DC voltage are compared by the operational amplifier 46. Thus, when the absolute value of the voltage Vi is abnormally increased due to a breakage of the overheating sensing line 2d, conductor 3d, resistor 10, resistor 12, capacitor 14, etc., the voltage Vd becomes lower than the first reference voltage −Vr1. The operational amplifier 46 is thus turned on, so that the sampling voltage V2 becomes equal to the voltage Vee. When this results, the output voltage V01 of the operational amplifier 51 is held at the high level and the collector of the transistor 52 at the low level, so that the thyristor 6 is kept off. Further, when the voltage Vi is reduced abnormally due to some other cause, the voltage Vd is increased so that the difference with the voltage Vcc becomes lower than Vr2. This situation is the same as when the temperature of the electric blanket 1 is excessive. When this results, the thyristor 6 is thus kept off to ensure the safety.

FIG. 5 shows a modification of the thyristor trigger circuit in the above embodiment. In this instance, the first reference circuit 39 and operational amplifier 46 in the circuit of FIGS. 2A and 2B are omitted, and the output terminal of zero-crossing detector 23 is directly connected to second reference circuit 47.

FIG. 6 shows a thyristor trigger circuit system used in another embodiment. In this instance, the DC voltage Vd is sampled under the control of the output of zero-crossing detector 23, and the sampled voltage is compared with the second reference voltage −Vr2 in operational amplifier 51. The output of the operational amplifier 51 is fed through an amplifier circuit 95 to the primary winding of a pulse transformer 96 which serves as a pulse transmission circuit with the secondary winding thereof connected to the gate of thyristor 6. The operation and effects obtainable with this embodiment are the same as in the above embodiment.

Another embodiment will now be described with reference to FIGS. 7 through 9. In this embodiment, the temperature detection voltage Vd is fed to sampling circuits 96 and 97. The sampling circuit 96 samples the voltage Vd in synchronism with the zero-crossing detection signal Vp from zero-crossing detector 23 and feeds the sampled voltage Vd1 to operational amplifier 46. The operational amplifier 46 compares the first reference voltage Vr1 and sampled voltage Vd1. When the voltage Vd1 becomes higher than the first reference voltage Vr1, the operational amplifier 46 provides an output as shown in (b) in FIG. 8. The sampling circuit 97 samples the voltage Vd in synchronism with the operational amplifier output. The sampled voltage Vd2 from the sampling circuit 97 is compared with the second reference voltage Vr2 by operational amplifier 51. When the voltage Vd2 is lower in level than the voltage Vr2, the operational amplifier 51 provides a pulse voltage V01 as shown in (d) in FIG. 8. Thyristor 6 is driven according to the voltage V01.

FIG. 9 is a connection diagram of the sampling circuits 96 and 97. Zero-crossing detector 23 is connected through a resistor 103 in the sampling circuit 97 to the base of a transistor 98 in the sampling circuit 96 and also connected through a resistor 104 to the base of a transistor 100. The transistor 100 has the emitter connected to a voltage terminal at Vee and the collector connected to the operational amplifier 51 and also connected through a resistor 105 to the output terminal of an operational amplifier 106 in a buffer circuit. The collector of the transistor 98 in the sampling circuit 96 is connected through a resistor 101 to the base of a transistor 99. The transistor 99 has a emitter connected to Vcc line and a collector connected to operational amplifier 46 and also connected through a resistor 102 to the output terminal of the operational amplifier 106. The input terminal of the operational amplifier 106 is connected to the output terminal of absolute value circuit 32. In the circuit of FIG. 9, the sampling circuit 96 samples the voltage Vd in synchronism with the zero-crossing detection signal Vp to provide the sampled output Vd1. The sampling circuit 97 samples the voltage Vd in synchronization with to the zero-crossing detection signal Vd.

Figure 10:
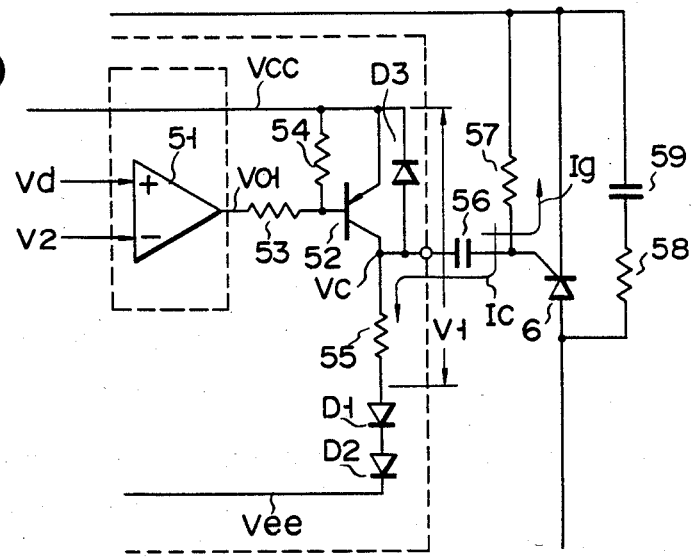
FIG. 10 is a circuit diagram showing a further modification of the thyristor trigger circuit and thyristor circuit.

FIG. 10 shows a thyristor trigger circuit TRG used in further another embodiment. In this circuit, the collector of transistor 52 is connected through resistor 55 and diodes D1 and D2 to Vee line. A diode D3 is connected in a reverse direction between the emitter and collector of the transistor 52.

In the thyristor trigger circuit of FIG. 10, the transistor 52 is off when the output voltage V01 of the operational amplifier 51 is at the Vcc level, i.e., high level in a period T1 as shown in (e) in FIG. 3. When the transistor 52 is turned off, a current Ic is caused to flow through a charging path of the resistor 57, capacitor 56, resistor 55 and diodes D1 and D2 to charge the capacitor 56. The transistor 52 is turned on when the voltage V01 goes to low level in synchronism with the zero-crossing detection signal. As a result, the capacitor 56 is discharged through the gate of the thyristor 6, causing a gate current Ig to flow through the thyristor 6. With this gate current Ig the thyristor 6 is turned on and kept on for the positive half cycle period. During this positive half cycle period, Ac voltage Vh is applied to the heater 2 to cause heat generation. During the subsequent negative half cycle the thyristor 6 is kept off. In this way, the thyristor 6 is kept on to permit power supply to the heater 2 for every positive half cycle period of the AC power source output. When the present temperature of the electric blanket is reached, the thyristor 6 is no longer turned on in the positive half cycle, so that power is no longer supplied to the heater 2.

When the resistor 57 in the circuit of FIG. 10 is broken, the capacitor 56 is no longer charged with the turn-off of the transistor 52. That is, in this situation the thyristor 6 is no longer turned on since a trigger signal is not supplied to the gate even when the transistor 52 is turned on. The heater 2 thus is not furnished with power even when the temperature of the electric blanket becomes lower than the preset temperature. In other words, this type of fault leads only to a temperature reduction of the electric blanket but does not lead to any hazard. However, the thyristor 6 may be at a high temperature and in an instable operating state at the time of such a fault. In such a case, the thyristor 6 may be turned on by a surge voltage although no trigger pulse is given. This, however, does not occur so frequently that the electric blanket is overheated.

When the voltage between the gate and cathode of the thyristor 6 exceeds the reverse breakdown voltage (approximately 5 V) with the resistor 57 in the broken state, a leakage current is caused to flow from the cathode to the gate of the thyristor 6 to cause charging of the capacitor 56. Therefore, when the transistor 52 is subsequently turned on, the thyristor 6 might be turned on with the discharging of the capacitor 56. However, the charging path has two series diodes D1, D2, so that the voltage V1 between the Vcc line and the connection point between the resistor 55 and diode D1 is lower than the voltage of 6.3 V between the Vcc and Vee lines by the forward voltage drop across the series diodes D1, D2, which is 0.7 V×2=1.4 V, that is, the voltage V1 is 4.9 V. Therefore, the voltage between the gate and cathode of the thyristor 6 does not exceed the thyristor gate-cathode breakdown voltage of approximately 5 V, so that no leakage current is caused to flow from the cathode to the gate of the thyristor 6. This means that there is no possibility for the thyristor 6 to be turned on by a trigger signal fed to it when the resistor 57 is broken.

Figure 11:
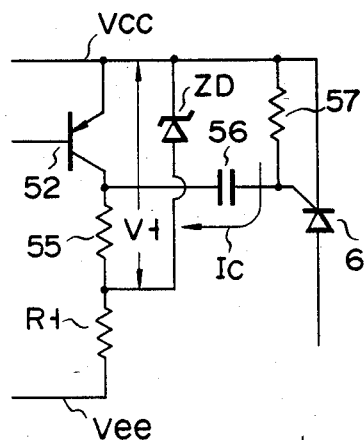
FIG. 11 is a circuit diagram showing a still further modification of the thyristor trigger circuit and thyristor circuit.

FIG. 11 shows thyristor trigger circuit and thyristor circuit used in still further another embodiment. In this instance, the collector of transistor 52 is connected through a resistor R1 to Vee line. The connection point between resistors 55 and R1 is connected to a zener diode ZD to Vcc line. The zener voltage of the zener diode ZD is, for instance, 4.9 V. When resistor 57 is broken, a voltage in excess of the gate-to-cathode reverse breakdown voltage of 5 V is no longer applied between the gate and cathode of thyristor 6, so that the thyristor 6 is no longer turned on. The zener diode ZD may be replaced with a resistor, the resistance of which is set such that the voltage V1 is below the gate-to-cathode reverse breakdown voltage of 5 V.

In the trigger circuit of FIG. 11, a current in excess of the charging current Ic flows through the zener diode ZD even if no charging current Ic flows through the capacitor 56. This means that power consumed is slightly increased. However, the power consumption can be minimized since the charging current Ic is equal to the current through the diode 57.

Further, if resistors 11 and 12 in the voltage division circuit composed of resistors 11 to 13 in thermal data detector 16 are connected not in series with the capacitors 3b and 3d but directly between resistor 9 and sensing line 2d and the voltage division circuit is connected in parallel with the impedance of the thermal sensing element 3c, it is possible to obtain temperature control without any trouble in the normal state of the apparatus, i.e., when there is no detachment or contact failure of the connector of the electric blanket 1 or there is no breakage of the conductors 3b and 3d. However, if the conductors 3b and 3d are broken at a point corresponding to one half of their length from the connection point between the resistor 9 and thermal sensing line 2d, the impedance of the thermal sensor 3 is doubled. If they are broken at a point corresponding to one-third of their length from the connection point, the thermal sensing line impedance is tripled. In such cases, the temperature detection voltage is increased so that the thermal sensor produces the same signal as produced when the temperature of the electric blanket is low. Consequently, the temperature of the electric blanket is abnormally elevated. With the construction described above, the potentiometer 8, resistor 9, conductor 3b, resistors 11 and 12 in the voltage division circuit and overheating sensing line 2d are connected in series, and the breakage is detected in this series circuit. Besides, wherever the breakage is detected, the voltage vi becomes either abnormally high or abnormally low. Thus, the thyristor 6 is turned and kept off, to prevent overheating of the electric blanket.

Where the voltage Vi is abnormally elevated due to a fault in the thermal sensor 3 as the temperature sensor, it is determined that the temperature of the electric blanket 1 is low if only the operational amplifier 51 as the second comparator is provided. However, whether the voltage Vd is in the normal range is detected by the operational amplifier 46 as the first comparator so that the thyristor 6 is kept off when the voltage vd is detected to be outside the normal range. Thus, it is possible to eliminate the hazard of overheating of the electric blanket 1 that would lead to a fire. Further, whether there is a fault is detected through the comparison of the Dc voltage vd, to which the output of the voltage division circuit in the thermal sensor 15 is converted, with the first reference voltage −Vr1. This means that unlike the prior art there is no need to provide any special input terminal and associated circuit for the detection of a breakage. The entire circuit construction thus can be simplified. Further, when the voltage Vs is increased abnormally due to a fault, the DC voltage Vd is increased to about 6 times the value in the normal state. Thus, the fault can be readily detected. Further, when a fault occurs, the peak of the voltage Vi is restricted to 12 V (AC) by the resistor 13 in the voltage division circuit and the zener diodes 33 and 34. Thus, a breakage fault will never cause a fault in the operational amplifier 35 or other circuit element. Further, the resistors 11 to 13 constituting the voltage division circuit that applies an extremely high voltage to the operational amplifier 35 may be small in size and inexpensive compared to a high breakdown voltage capacitor.

Figure 12:
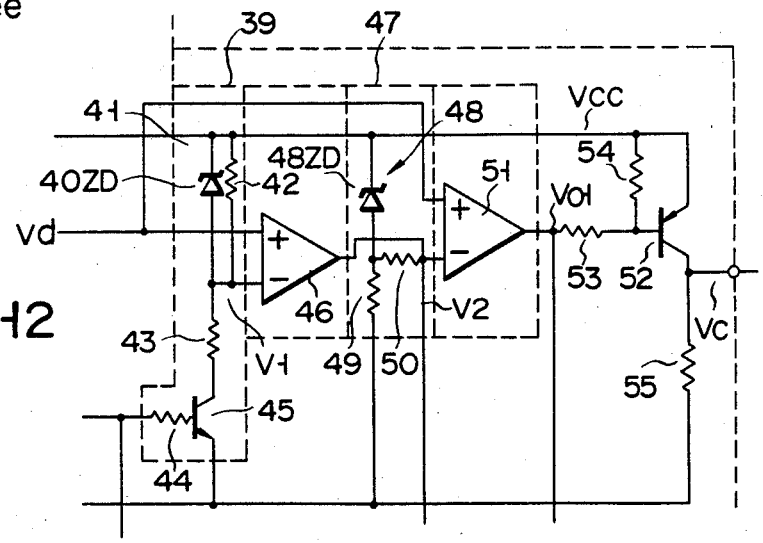
FIG. 12 is a circuit diagram showing a modification of a reference circuit.

Further, the series diodes 41 and 48a to 48c in the first and second reference circuits 39 and 47 may be respectively replaced with zener diodes 40ZD and 48ZD, as shown in FIG. 12. FIG. 13 shows a second reference circuit 47 used in another embodiment. In this instance, a series circuit composed of a potentiometer 96 and a resistor 97 is provided between Vcc line and output terminal of operational amplifier 46. With this arrangement, the second reference voltage Vr2 varies to vary the preset temperature of the electric blanket.

FIG. 14 shows a further modification. In this instance, a triac 107 is used as the switching element instead of thyristor 6, and the voltage Vc is inverted through a transistor 108 and a resistor 109 to be applied to the gate of the triac 107. Further, the thyristor 6 may be arranged to drive a relay so as to turn the heating wire 2b on-off with a relay switch.

As has been described in the foregoing, the temperature control apparatus according to the invention comprises a thermal sensor for detecting the temperature of a flat heating apparatus, a zero-crossing detector for detecting zero-crossing of an AC power source output, a thermal data detector providing a voltage corresponding to the temperature detected by the thermal sensor, comparator means for sampling either detected temperature voltage and a reference voltage in synchronization with a zero-crossing detection signal provided from the zero-crossing detector and comparing the sampled voltage and the other voltage than the sampled voltage to produce a comparison result signal in the form of a pulse signal, and a circuit for on-off controlling a switching element to control power supply to a heater according to the comparison result signal. With this temperature control apparatus, a fault that may occur in the temperature control system will inhibit the generation of a pulse signal as the signal, according to which the switching element for controlling power supply to the heater is turned on-off. The heater is thus kept off to eliminate the possibility of heat being generated that would result in a fire.

What is claimed is:

1. A temperature control apparatus for electric heating equipment powered by an AC power source, comprising:
   switching means for selectively applying AC power from the source to the electric heating equipment;
   thermal information output means for detecting the temperature of the electric heating equipment supplied with power from the AC power source and for providing thermal information representing the temperature detected;
   zero crossing detector means for detecting zero crossings of the AC power source;
   reference data output means for providing first reference data representing a low reference temperature and second reference data representing a high reference temperature;
   pulsing means for comparing said thermal information with said first reference data and generating a first pulse signal in synchronism with said zero crossings of said AC power source;
   pulse signal output means for comparing said thermal information with said second reference data and generating a second pulse signal; and
   triggering means, connected to said pulse signal output means for triggering said switching means according to the second pulse signal from said pulse signal output means;
   wherein said reference data output means includes first reference data sampling means for sampling first reference data in synchronism with the zero crossings of said AC power source and second reference data sampling means for sampling second reference data in synchronism with the zero crossings of said AC power source, and
   said pulse signal output means comprises first comparing means connected to said thermal information output means and the first reference data output means for comparing the thermal information with the first reference data sampled by said first sampling means, to thereby generate a first comparison signal as the second reference data and second comparing means connected to the first comparing means and said thermal information output means for comparing the second reference data sampled by said second sampling means with the thermal information to thereby generate a second comparison signal as the second pulse signal.

2. The temperature control apparatus according to claim 1, wherein said switching means is a triac.

3. A temperature control apparatus for electric heating equipment, comprising:
   switching means for selectively supplying AC power to the electric heating equipment;
   thermal information output means for detecting the temperature of the electric heating equipment and for providing thermal information representing the temperature detected;
   zero crossing detector means for detecting zero crossings of said AC power;
   reference data output means for outputting first and second reference data, said first and second reference data differing in value from each other;
   first sampling circuit means for sampling one of said first reference data and said thermal information in synchronism with the zero crossings detected by said zero crossing detector means, to obtain a first sampled data;
   first comparing means for comparing said first sampled data with one of said thermal information and said first reference data to obtain a first pulse signal which is synchronized with said zero crossings;
   second sampling circuit means for sampling one of said second reference data and said thermal information in synchronism with the first pulse of said first comparing means to obtain a second sampled data;
   second comparing means for comparing said second sampled data with one of said thermal information and said second reference data to output a second pulse signal which is synchronized with the zero crossings; and
   triggering means, connected to said second comparing means, for triggering said switching means according to the second pulse signal from said second comparing means.

4. The temperature control apparatus according to claim 3, wherein said triggering means comprises a switching element which is turned on and off by the second pulse signal from said pulse signal output means and means for applying a trigger signal to said switching means under control of the switching element.

5. The temperature control apparatus according to claim 3, wherein said triggering means comprises a pulse transformer for transmitting the second pulse signal to said switching means.

6. The temperature control apparatus according to claim 3, wherein said switching means is a thyristor, and said triggering means comprises a switching element which is turned on and off by the second pulse signal from said pulse signal output means, a capacitor connected between this switching element and the gate electrode of the thyristor for charging and discharging to generate a trigger signal, and diode circuit means connected in series to the capacitor and the switching element, said diode circuit means undergoing a forward voltage drop.

7. The temperature control apparatus according to claim 3, wherein at least one of said first and second sampling circuit means has a serial array of diodes, a voltage drop in the forward direction of this diode array being output as said reference information.

8. The temperature control apparatus according to claim 3, wherein at least one of said first and second sampling circuit means has a zener diode which has a predetermined zener voltage and which provides this zener voltage as the reference information.

9. The temperature control apparatus according to claim 3, wherein at least one of said first and second sampling circuit means includes voltage-dividing circuit means having a potentiometer for varying a voltage drop, the voltage drop of said voltage-dividing circuit means being used as the reference information.

10. A temperature control apparatus as in claim 3 wherein said thermal information output means includes thermal sensing means for generating a voltage signal representing a temperature of said electrical equipment, and means for converting the voltage signal into said thermal information, said thermal sensing means including a thermal sensing member whose impedance value varies with temperature and means for converting the impedance of the thermal sensing member into said voltage signal, wherein said means for converting impedance into a voltage signal includes at least two voltage dividing elements connected in series between the terminals of said thermal sensing member and a variable resistor connected in series to said thermal sensing members.

* * * * *